United States Patent
Khamnualthong et al.

(10) Patent No.: US 9,659,587 B1
(45) Date of Patent: May 23, 2017

(54) MAGNETIC HEAD HAVING A READER OVERCOAT WITH DLC AND A RECESSED WRITER OVERCOAT WITHOUT DLC

(71) Applicant: Western Digital (Fremont), LLC, Fremont, CA (US)

(72) Inventors: Nattaporn Khamnualthong, Lamlukka (TH); Krisda Siangchaew, Ta Sai (TH); Sakthavorn Phongwanitchaya, Patumtani (TH)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/934,453

(22) Filed: Nov. 6, 2015

(51) Int. Cl.
| | |
|---|---|
| G11B 5/127 | (2006.01) |
| G11B 5/40 | (2006.01) |
| G11B 5/39 | (2006.01) |
| G11B 5/60 | (2006.01) |
| G11B 5/00 | (2006.01) |

(52) U.S. Cl.
CPC .............. *G11B 5/40* (2013.01); *G11B 5/1272* (2013.01); *G11B 5/3906* (2013.01); *G11B 5/6082* (2013.01); *G11B 2005/0021* (2013.01)

(58) Field of Classification Search
CPC ................................ G11B 5/127; G11B 5/147
USPC ......................................................... 360/110
See application file for complete search history.

(56) References Cited

U.S. PATENT DOCUMENTS

| | | | |
|---|---|---|---|
| 6,075,673 A | 6/2000 | Wilde et al. | |
| 6,097,575 A | 8/2000 | Trang et al. | |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,330,131 B1 | 12/2001 | Nepela et al. | |

(Continued)

*Primary Examiner* — Allen T Cao
(74) *Attorney, Agent, or Firm* — Loza & Loza, LLP; Gabriel Fitch (57) ABSTRACT

A magnetic head includes a slider defining an air bearing surface (ABS) and having a trailing face approximately orthogonal to the ABS. A transducer is disposed on the trailing face and includes a reader and a writer. The writer comprises a non-ferromagnetic writer encapsulate material, and includes a ferromagnetic write pole embedded in the non-ferromagnetic writer encapsulate material. The reader comprises a non-ferromagnetic reader encapsulate material, and includes a magnetoresistive sensor stack embedded in the non-ferromagnetic reader encapsulate material. The magnetic head further includes a novel dual overcoat having a writer overcoat material disposed on the writer, and a reader overcoat material disposed on the reader. The reader overcoat material comprises diamond-like carbon (DLC), and the writer overcoat material does not comprise DLC. An example method for fabricating the novel dual overcoat is also disclosed.

26 Claims, 5 Drawing Sheets

(56) References Cited

U.S. PATENT DOCUMENTS

| | | |
|---|---|---|
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,433,965 B1 | 8/2002 | Gopinathan et al. |
| 6,522,504 B1 | 2/2003 | Casey |
| 6,538,850 B1 | 3/2003 | Hadian et al. |
| 6,583,953 B1 | 6/2003 | Han et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,791,839 B2 | 9/2010 | Olson et al. |
| 7,916,424 B2 | 3/2011 | Biskeborn |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,760,980 B2 | 6/2014 | Zhang et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 8,947,985 B1 | 2/2015 | Morelli et al. |
| 9,142,233 B1 | 9/2015 | Gibbons et al. |
| 2010/0265618 A1* | 10/2010 | Boutaghou ......... G11B 5/6005 360/234.3 |
| 2013/0244541 A1 | 9/2013 | Yaemglin et al. |
| 2013/0293982 A1 | 11/2013 | Huber |
| 2014/0140180 A1 | 5/2014 | Zhang et al. |
| 2014/0177405 A1 | 6/2014 | Rejda et al. |

\* cited by examiner

MAGNETIC HEAD HAVING A READER OVERCOAT WITH DLC AND A RECESSED WRITER OVERCOAT WITHOUT DLC

BACKGROUND

Information storage devices are used to retrieve and/or store data in computers and other consumer electronics devices. A magnetic hard disk drive is an example of an information storage device that includes one or more magnetic heads that can both read and write, but other information storage devices also include heads—sometimes including heads that cannot write. A magnetic tape drive is another example of an information storage device that uses read/write heads.

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. In a magnetic hard disk drive, the transducer is typically supported in very close proximity to a spinning magnetic disk by a hydrodynamic air bearing. To protect the transducer, it is typically coated with an overcoat material. As a motor rotates the magnetic disk, the hydrodynamic air bearing is formed between an air bearing surface of the slider of the head and a surface of the magnetic disk. The thickness of the air bearing at the location of the transducer is commonly referred to as the "mechanical flying height."

The magnetic disk typically includes several layers near its surface, including a hard magnetic layer in which information is recorded and stored. A disk protective layer typically covers the hard magnetic layer to improve wear and corrosion resistance. The hard magnetic layer is typically supported by one or more underlayers with desired surface and/or properties. For example, in perpendicular recording applications, a magnetically soft underlayer may help channel magnetic flux beneath the hard magnetic layer.

The magnetic transducer of the head and the hard magnetic layer of the disk are typically separated by the air bearing, the transducer overcoat material, and the disk protective layer. This separation is typically referred to as the "magnetic head-disk spacing," the "magnetic spacing," or the "magnetic flying height." In magnetic tape drives, the separation may be referred to as the "magnetic head-tape spacing."

Diamond-like carbon (DLC) conventionally has been used in both the transducer overcoat and disk protective layers, because it has high density and high hardness. DLC has been shown to provide good resistance against tribological wear at the head disk interface, and good protection against corrosion of the transducer reader and of the hard magnetic layer of a disk. However, the inventors named herein have experimentally learned that DLC may not be the best overcoat material for the transducer writer in an information storage device that utilizes so-called "heat assisted magnetic recording" (HAMR). Accordingly, what is needed in the art is an improved head transducer overcoat for use on magnetic recording heads in HAMR applications.

DETAILED DESCRIPTION OF EXAMPLE EMBODIMENTS

Figure 1:
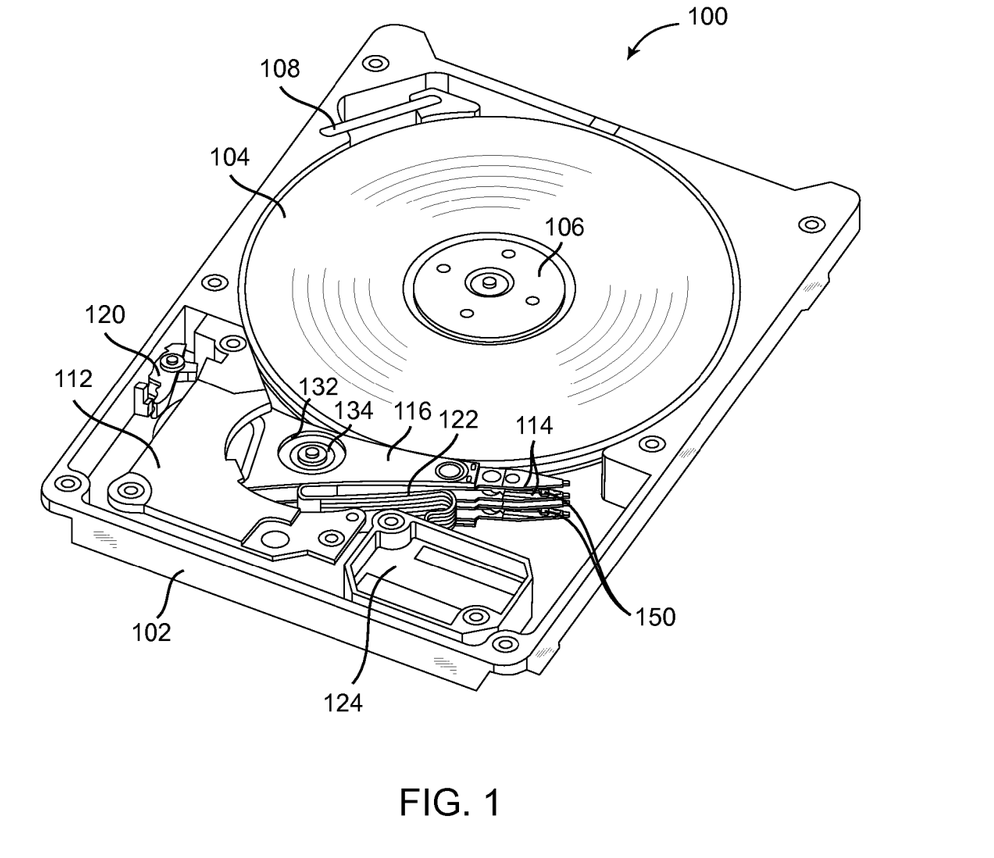
FIG. 1 is a top perspective view of a disk drive information storage device that is capable of including an embodiment of the present invention, with the top cover removed to reveal internal components.

FIG. 1 is a top perspective view of a disk drive 100 that is capable of including an embodiment of the present invention, with the top cover removed to reveal internal components. The disk drive 100 includes a disk drive base 102 and two annular magnetic disks 104. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 116 that is pivotably mounted on disk drive base 102, for example by a pivot bearing 134 fit into a bore 132 in the body of the actuator 116. A voice coil motor 112 may pivot the actuator 116 through a limited angular range so that at least one head gimbal assembly (HGA) 114 is desirably positioned relative to one or more tracks of information on a corresponding one of the disks 104. In the embodiment of FIG. 1, the actuator 116 includes three arms upon which four HGAs 114 are attached, each corresponding to a surface of one of the two disks 104. However in other embodiments fewer or more HGAs 114 may be included depending on the number of disks 104 that are included and whether the disk drive 100 is depopulated.

Each HGA 114 preferably includes a head 150 for reading and writing from/to one of the disks 104. The head 150 may perform various functions and contain various microscopic structures such as a read transducer for reading data, a write transducer for writing data, a microactuator, a heater, a laser, a lapping guide, etc. The actuator 116 may occasionally be latched at an extreme angular position within the limited angular range, by latch 120. Electrical signals to/from the HGAs 114 are carried to other drive electronics via a flexible printed circuit (FPC) that includes a flex cable 122 (preferably including a preamplifier circuit) and flex cable bracket 124.

Figure 2:
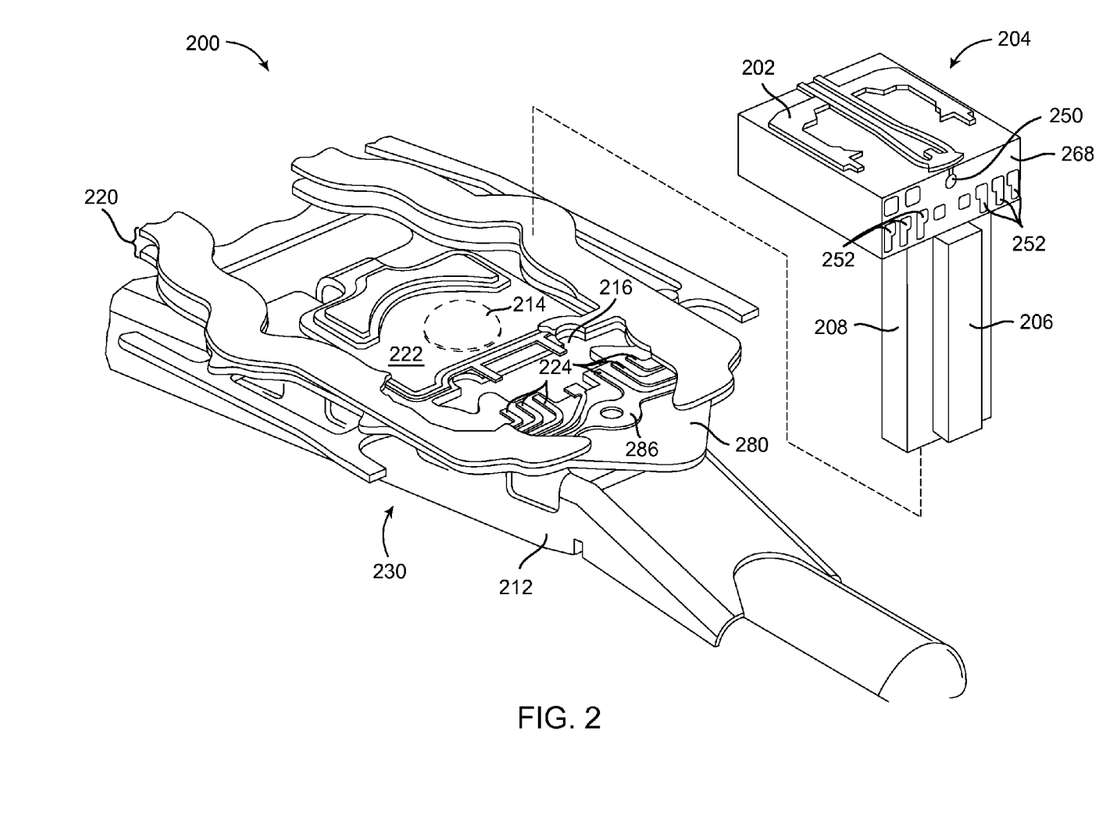
FIG. 2 depicts a distal end of a head gimbal assembly that includes a head that is capable of including an embodiment of the present invention.

FIG. 2 is a perspective view of the distal portion of a head gimbal assembly (HGA) 200 capable of including an embodiment of the present invention. In FIG. 2, a head 204 (and mounted laser diode 206 and laser submount 208) is shown exploded away from a suspension assembly 230 of the HGA 200. A slider air bearing surface (ABS) 202 may be formed by etching or ion milling into a slider substrate of the head 204, according to dimensions that may be defined by use of a mask. The slider substrate of the head 204 includes a trailing face 268 that is approximately orthogonal to the ABS 202 (e.g. within ±10° of perfect orthogonality). The head 204 includes a read/write transducer 250 deposited on the trailing face 268. The laser diode 206 and laser submount 208 may pass through an optional opening 216 in the suspension assembly 230. This is shown by the dashed line in FIG. 2, which, although truncated in FIG. 2 to avoid clutter, otherwise would pass through the optional opening 216 (if the dashed line were extended).

In the embodiment of FIG. 2, the suspension assembly 230 may comprise a load beam 212 and a laminated flexure 220. A purpose of the load beam 212 is to provide vertical compliance for the head 204 to follow vertical undulations of the surface of a disk (e.g. disk 104 of FIG. 1) as it rotates, and to preload the slider ABS 202 of the head 204 against the disk surface by a preload force that is commonly referred to as the "gram load," during disk drive operation. The laminated flexure 220 may include a tongue 222 on which the read head 204 may be mounted. The tongue 222 may be in contact with the load beam 212, for example via a conventional dimple 214 that transfers the gram load from the load beam 212 to the head 204 to preload the slider ABS 202 against the surface of a rotating disk.

A first purpose of the laminated flexure 220 may be to provide compliance for the head 204 to follow pitch and roll angular undulations of the surface of the disk (e.g. disk 104) as it rotates, while restricting relative motion between the head 204 and the load beam 212 in the lateral direction and about a yaw axis. A second purpose of the laminated flexure 220 may be to provide a plurality of electrical paths to facilitate signal transmission to/from the head 204.

For that second purpose, the laminated flexure 220 may include a plurality of electrically conductive traces 224 that are defined in an electrically conductive layer 286, and that are electrically isolated from a supporting structural layer 280. The electrically conductive traces 224 may comprise copper, for example, and the supporting structural layer 280 may comprise stainless steel. In the embodiment of FIG. 2, the read/write transducer 250 may be electrically accessed through a subset of the head bond pads 252 on the slider trailing face 268. Each of the head bond pads 252 is preferably electrically connected to a respective one of the conductive traces 224, for example by gold ball bonding or another applicable conventional method.

Figure 3:
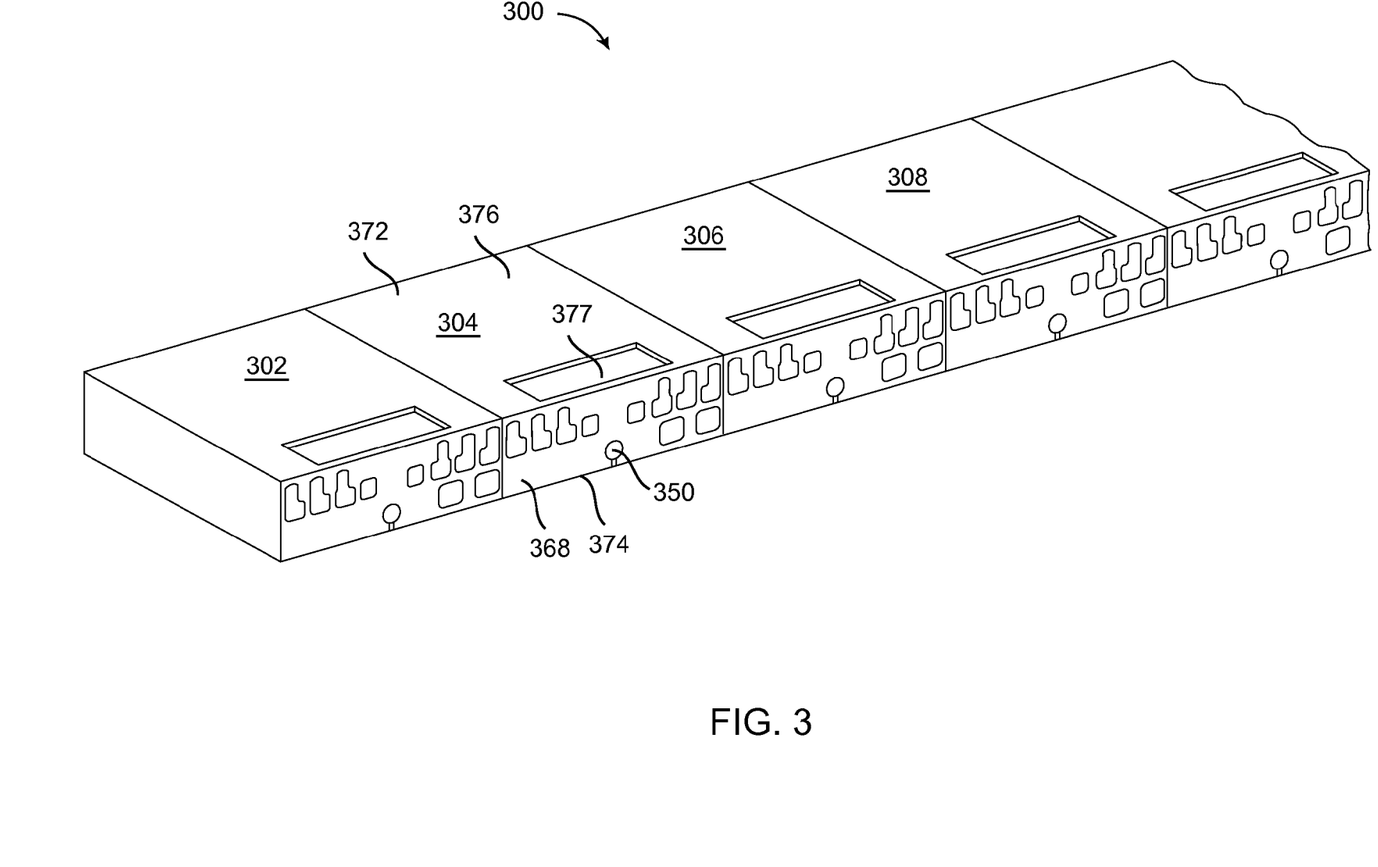
FIG. 3 depicts a row of magnetic heads that are capable of including transducers according to an embodiment of the present invention.

FIG. 3 depicts a row 300 of magnetic heads 302, 304, 306, 308, each capable of including a read/write transducer according to an embodiment of the present invention. The head 304 includes a slider substrate 372 having a trailing face 368. The slider substrate 372 may comprises silicon or a preferred ceramic material such as alumina titanium carbide AlTiC. The slider substrate 372 may include a slider air bearing surface (ABS) 374 that is substantially orthogonal to the trailing face 368 (e.g. within ±10° of being perfectly orthogonal). In certain embodiments, the ABS 374 may be smoothed by a conventional lapping process while still adjoined to the rest of the row 300. The slider substrate may also include a mounting face 376 to which the head 304 may be adhered to the mounting tongue of a suspension assembly (as shown in FIG. 2), after the head 304 is cut away from the rest of the row 300. The slider mounting face 376 may optionally include a region 377 for attachment of a laser submount.

In the embodiment of FIG. 3, the head 304 includes a read/write transducer 350 disposed on the slider trailing face 368 and extending to the ABS 374. In certain embodiments, the read/write transducer 350 may preferably be an inductive magnetic write transducer merged with a magneto-resistive read transducer. In such embodiments, the magneto resistive element may be a giant magneto resistive element (GMR) or tunneling magneto resistive element (TMR). In such embodiments, the writer may be a perpendicular magnetic recording (PMR) writer, and in such cases a corresponding disk may preferably include a soft magnetic underlayer (beneath a hard magnetic layer to which data is recorded).

In certain embodiments the entire read/write transducer 350 may be marginally recessed from the slider ABS 374 due to prior conventional processing steps. For example, the read/write transducer 350 may be recessed from the slider ABS 374 by approximately 2.5 nanometers due to a prior lapping and/or etching process step (thereby increasing the magnetic spacing by approximately 2.5 nanometers). The transducer 350 may also slightly protrude beyond the slider ABS 374 due to thermal expansion (e.g. thermal pole tip protrusion and/or thermal dynamic transducer actuation), thereby reducing the magnetic spacing by the amount of protrusion. However, such protrusion or recession of the entire read/write transducer relative to the slider ABS is unimportant in this disclosure. Therefore, subsequently herein, the terms "ABS" and "ABS plane" will refer to that of the closest portion of the read/write transducer to the magnetic disk or magnetic tape, and not refer to that of the slider substrate.

Figure 4:
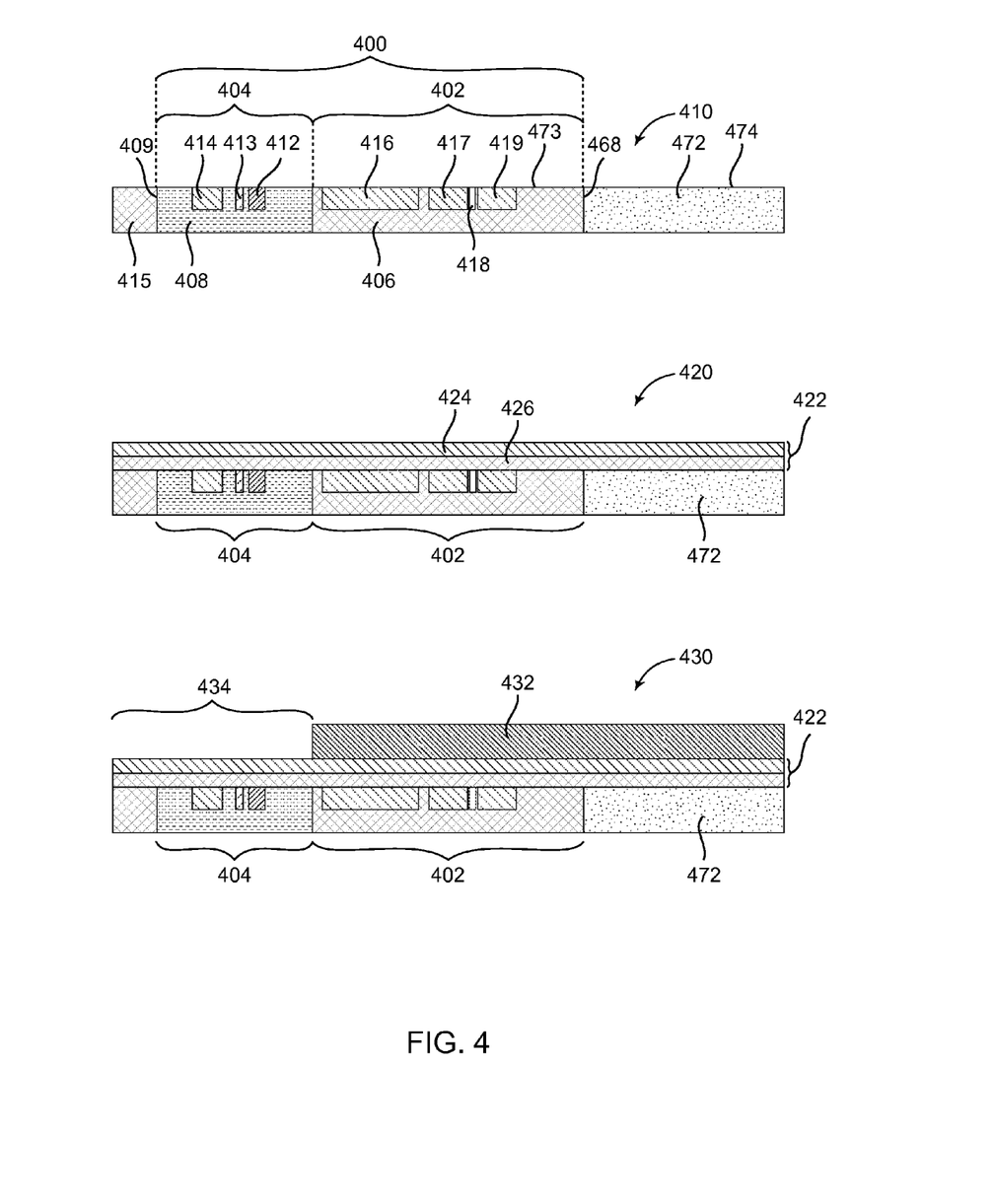
FIG. 4 depicts three steps of an example method for fabricating a novel transducer overcoat.
Figure 5:
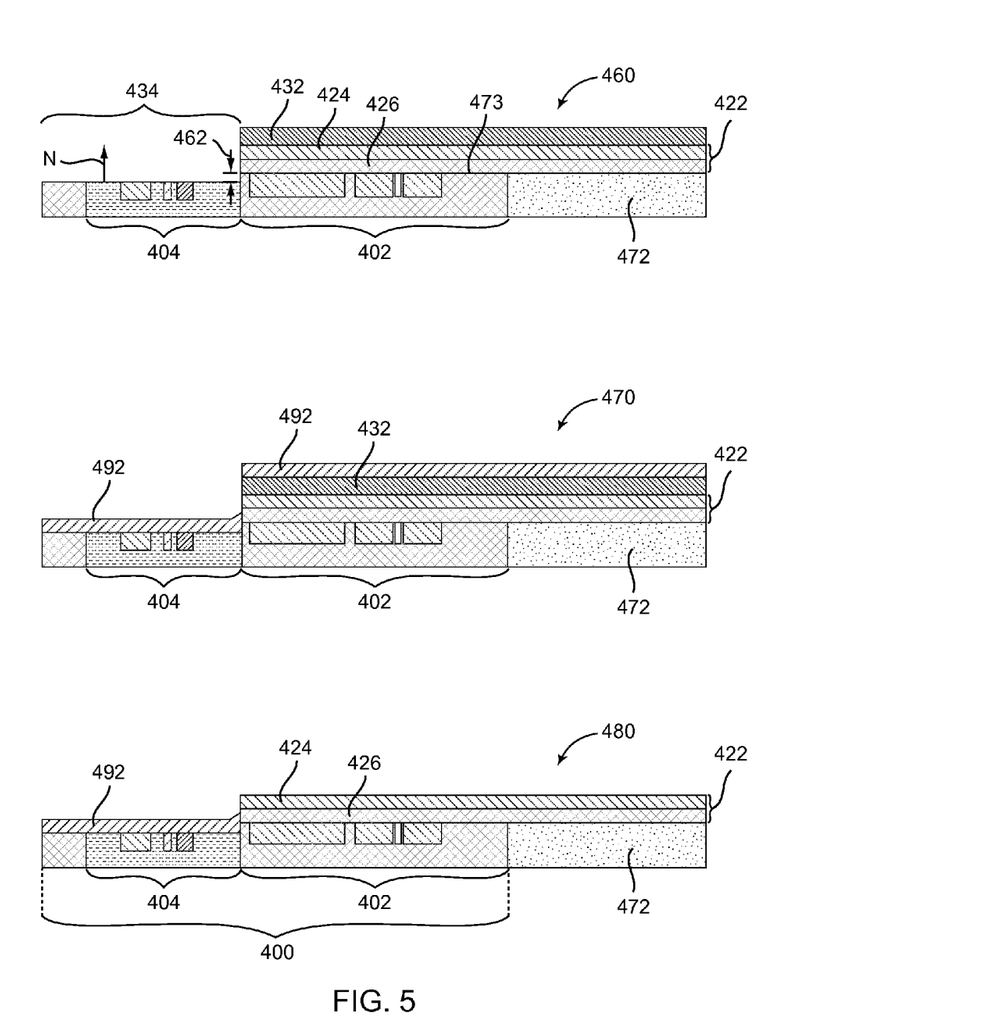
FIG. 5 depicts three more steps of an example method for fabricating a novel transducer overcoat.

The read/write transducer 350 is preferably protected by a transducer overcoat. FIG. 4 depicts three steps 410, 420, and 430 of an example method for fabricating a novel transducer overcoat. FIG. 5 depicts three more steps 460, 470, and 480 of this example method. It is contemplated that in certain alternative embodiments, there optionally may be more steps than just those shown in FIGS. 4 and 5, either preceding or subsequent, and/or optional intermediate steps inserted between the steps shown in FIGS. 4 and 5.

Now referring to FIG. 4, a read/write transducer 400 is disposed on a trailing face 468 of a slider 472. The read/write transducer 400 includes a writer 404 and a reader 402, having a transducer air bearing surface (ABS) 473. In step 410, the read/write transducer 400 optionally may be lapped to improve smoothness and flatness, and/or etched. For example, the read/write transducer 400 is shown in FIG. 4 to have been lapped and/or etched to have a transducer air bearing surface (ABS) 473 that may be optionally initially coplanar with a slider ABS 474 (though transducer recession or protrusion relative to the slider ABS 474 are also possible and contemplated herein). After lapping, the transducer ABS optionally may be cleaned before subsequent deposition steps, for example by argon plasma etching.

In the embodiment of FIG. 4, the writer 404 includes a non-ferromagnetic writer encapsulate material 408 (e.g. a non-ferromagnetic ceramic material such as silicon dioxide). The writer 404 also includes at least one ferromagnetic write pole 414 (e.g. a soft magnetic material such as permalloy) embedded in the non-ferromagnetic writer encapsulate material 408. A trailing surface 409 of the read/write transducer 400, facing away from the trailing face 468 of a slider 472, may be protected by an optional outer protective layer 415 (e.g. alumina).

In the embodiment of FIG. 4, the writer 404 optionally includes a non-ferromagnetic optical core 412 that is also embedded in the non-ferromagnetic writer encapsulate material 408. The non-ferromagnetic optical core 412 preferably comprises an optical core material (e.g. tantalum, or tantalum oxide), that is not the same as the non-ferromagnetic writer encapsulate material 408. In the embodiment of FIG. 4, the writer 404 also optionally includes a near field transducer (NFT) 413 that is also embedded in the non-ferromagnetic writer encapsulate material 408. In certain embodiments, the NFT 413 may comprise gold, for example.

In the embodiment of FIG. 4, the reader 402 includes a non-ferromagnetic reader encapsulate material 406 (e.g. a non-ferromagnetic ceramic material such as alumina). The reader 402 may also include a shielded magnetoresistive sensor stack 418 disposed between ferromagnetic shields 417, 419, and embedded in the non-ferromagnetic reader encapsulate material 406. The shielded magnetoresistive sensor stack 418 may comprise a conventional tunneling magnetoresistive sensor stack, for example. The ferromagnetic shields 417, 419 may comprise NiFe, for example.

Another ferromagnetic writer pole 416 structure, or another conventional structure of the read/write transducer 400, optionally may be disposed within the non-ferromagnetic reader encapsulate material 406 (and therefore be disposed in the region of the reader 402). Such a writer pole structure 416 optionally may include a conventional touchdown sensor (TDS).

In step 420, a reader overcoat 422 including diamond-like carbon (DLC) may be deposited on the read/write transducer 400. Optionally, the reader overcoat 422 may be a bilayer comprising a DLC laminate 424 over a SiN laminate 426. For example, the SiN laminate optionally may be deposited by a suitable deposition process such as conventional radio frequency magnetron sputtering, after which the DLC laminate may be deposited by a suitable deposition process such as filter cathodic arc deposition. In certain embodiments, such deposition processes preferably may be continued until the bilayer has a thickness in the range of 2 to 3 nm.

A layer of photoresist material 432 may then be deposited on the first overcoat 422, as shown in step 430 of the example method of FIG. 4. Using a conventional photoresist patterning technique (e.g. development after selective light exposure through a patterned mask), the photoresist material 432 may be removed over the writer 404 but not over the reader 402, to define an exposed region 434 of the first overcoat 422 over the writer 404 that is not covered with the layer of photoresist material 432.

Now referring additionally to FIG. 5, the exposed region 434 may be etched in step 460 to remove the first overcoat 422 there, and to recess the writer 404 from the ABS 473 (i.e. relative to the reader) by a relative recession 462 that is preferably in the range of 1 nm to 5 nm. Note that the relative recession 462 is measured in a direction N that is normal to the plane of the air bearing surface 473. For example, the DLC laminate 424 optionally may be etched away by an electrical energy induced plasma of argon and oxygen, or alternatively by ozone etching. The SiN laminate 426 optionally may be etched away by argon plasma etching, and then the writer 404 recessed by further argon plasma etching. Alternatively, krypton or xenon may be used in place of argon in that example etching technique for step 460.

In step 470 shown in the example of FIGS. 4 and 5, a second overcoat 492 may be deposited on the read/write transducer 400. In the embodiment of FIG. 5, the second overcoat 492 does not include DLC, and may optionally comprise Ti, Zr, Cr, titanium oxide, titanium nitride, zirconium oxide, zirconium nitride, an oxide of chromium, or a nitride of chromium, for example. Depositing the second overcoat 492 on the transducer 400 may optionally be accomplished by radio frequency magnetron sputtering, continued until the second overcoat preferably has a thickness in the range of 2 to 5 nm. In certain embodiments, the second overcoat 492 optionally may be a laminated overcoat that comprises a plurality sublayers, each sublayer defining a sublayer thickness in the range of 0.4 nm to 2 nm. The second overcoat 492 is not required to have uniform thickness. For example, in certain embodiments the deposition process step 470 may incidentally result the second overcoat 492 having a build-up or localized region of increased thickness adjacent to the first overcoat 422.

In step 480 shown in the example of FIG. 5, the photoresist layer 432 has been removed, taking with it the portion of the second overcoat 492 that was disposed over the reader 402, so that the writer 404 is overcoated by only the second overcoat 492, and the reader 402 is overcoated by only the first overcoat 422. After step 480, the first overcoat 422 can be considered as a reader overcoat (that includes DLC), and the second overcoat 492 can be considered as a writer overcoat (that does not include DLC). When used in conjunction with the relative recession 462, this material difference between the reader overcoat and the writer overcoat may provide substantial advantages for information storage devices that utilize heat-assisted magnetic recording (HAMR).

Specifically, in HAMR applications the writer 404 of the read/write transducer 400 (shown in FIGS. 4 and 5) may use the optical core 412 to direct laser light to temporarily heat a small region of the disk or tape to which data is being written. In such applications, it can be helpful for the writer overcoat 492 to: 1) be structurally and chemically stable enough at high temperature to reduce decomposition; 2) have an optical index that, considered together with that of the optical core 412 and the employed laser wavelength, can serve to acceptably limit power absorption; and 3) have a coefficient of thermal expansion that is not so different from that of the underlying writer components that early delamination is prone to occur. The present inventors have experimentally determined that conventional transducer overcoat materials that include DLC do not provide these advantages for HAMR applications as well as the example non-DLC second overcoat materials described herein do.

By contrast, in the embodiment of FIGS. 4 and 5, it may be advantageous for the reader overcoat 422 to include DLC because the relative recession 462 deliberately makes the reader 402 more likely to contact the disk or tape media than is the writer 404. Hence, the high density and high hardness of DLC in the reader overcoat 422 may provide enhanced resistance against tribological wear and corrosion of the reader 402. Therefore, the difference in the materials disclosed for the reader overcoat 422 versus the writer overcoat 492, when used in conjunction with the relative recession 462, may provide unique advantages for certain information storage device applications utilizing HAMR.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A magnetic head comprising:
  a slider defining an air bearing surface (ABS) and having a trailing face approximately orthogonal to the ABS; and
  a transducer disposed on the trailing face and including a reader and a writer,
    wherein the writer comprises
      a non-ferromagnetic writer encapsulate material; and
      a ferromagnetic write pole embedded in the non-ferromagnetic writer encapsulate material; and wherein the reader comprises
a non-ferromagnetic reader encapsulate material; and
a magnetoresistive sensor stack embedded in the non-ferromagnetic reader encapsulate material; and
wherein the magnetic head further comprises a writer overcoat material disposed on the writer, and a reader overcoat material disposed on the reader, the reader overcoat material comprising diamond-like carbon (DLC), and the writer overcoat material not comprising DLC.

2. The magnetic head of claim 1 wherein the writer further comprises a non-ferromagnetic optical core also embedded in the non-ferromagnetic writer encapsulate material, the nonferromagnetic optical core comprising an optical core material that is not the same as the non-ferromagnetic writer encapsulate material.

3. The magnetic head of claim 1 wherein the reader further comprises a ferromagnetic shield also embedded in the non-ferromagnetic reader encapsulate material.

4. The magnetic head of claim 1 wherein the ABS defines an air bearing plane, and the writer is recessed at least 1 nm further from the air bearing plane, in a direction normal to the air bearing plane, than is the reader.

5. The magnetic head of claim 4 wherein the writer is recessed no more than 5 nm further from the air bearing plane, in a direction normal to the air bearing plane, than is the reader.

6. The magnetic head of claim 1 wherein the non-ferromagnetic writer encapsulate material is silicon dioxide.

7. The magnetic head of claim 1 wherein the non-ferromagnetic reader encapsulate material is aluminum oxide.

8. The magnetic head of claim 2 wherein the optical core material is tantalum oxide.

9. The magnetic head of claim 1 wherein the writer overcoat material comprises a material selected from the group consisting of Ti, Zr, Cr, titanium oxide, titanium nitride, zirconium oxide, zirconium nitride, an oxide of chromium, and a nitride of chromium.

10. The magnetic head of claim 1 wherein the writer overcoat defines a writer overcoat thickness in the range of 2 to 5 nm.

11. The magnetic head of claim 10 wherein the writer overcoat is a laminated writer overcoat that comprises a plurality sub layers, each sub layer defining a sub layer thickness in the range of 0.4 nm to 2 nm.

12. The magnetic head of claim 1 wherein the reader overcoat material comprises a bilayer of SiN and DLC.

13. The magnetic head of claim 1 wherein the reader overcoat defines a reader overcoat thickness in the range of 2 to 3 nm.

14. A disk drive comprising:
a disk drive base;
a disk rotatably attached to the disk drive base;
an actuator attached to the disk drive base; and
magnetic head attached to the actuator, the magnetic head including
a slider having an air bearing surface (ABS) that faces the disk, and having a trailing face that is approximately orthogonal to the ABS; and
a transducer disposed on the trailing face and including a reader and a writer,
wherein the writer comprises
a non-ferromagnetic writer encapsulate material; and
a ferromagnetic write pole embedded in the non-ferromagnetic writer encapsulate material; and
wherein the reader comprises
a non-ferromagnetic reader encapsulate material; and
a magnetoresistive sensor stack embedded in the non-ferromagnetic reader encapsulate material; and
wherein the magnetic head further comprises a writer overcoat material disposed on the writer, and a reader overcoat material disposed on the reader, the reader overcoat material comprising diamond-like carbon (DLC), and the writer overcoat material not comprising DLC.

15. A method to manufacture a magnetic head including a transducer that includes a reader and a writer, the method comprising:
depositing a first overcoat on the transducer, the first overcoat including diamond-like carbon (DLC);
depositing a layer of photoresist material on the first overcoat;
removing the photoresist material over the writer but not over the reader, to define an exposed region of the first overcoat over the writer that is not covered with the layer of photoresist material;
etching the exposed region to remove the first overcoat over the writer and to recess the writer from an air bearing surface (ABS) of the magnetic head by least 1 nm relative to the reader;
depositing a second overcoat on the transducer, the second overcoat not comprising DLC;
removing the photoresist layer so that the writer is overcoated by only the second overcoat and the reader is overcoated by only the first overcoat.

16. The method of claim 15 wherein depositing the first overcoat on the transducer comprises depositing a bilayer of SiN and DLC.

17. The method of claim 16 wherein the SiN is deposited by radio frequency magnetron sputtering.

18. The method of claim 16 wherein the DLC is deposited by filter cathodic arc deposition.

19. The method of claim 16 wherein depositing the first overcoat is continued until the bilayer has a thickness in the range of 2 to 3 nm.

20. The method of claim 16 wherein etching the exposed region comprises etching away the DLC by an electrical energy induced plasma of argon and oxygen.

21. The method of claim 16 wherein etching the exposed region comprises etching away the SiN by argon plasma etching, and recessing the writer by further argon plasma etching.

22. The method of claim 15 wherein the etching of the exposed region is continued until the writer is recessed from the ABS, relative to the reader, by a relative recession in the range of 1 nm to 5 nm.

23. The method of claim 15 further comprising lapping the ABS of the magnetic head, and cleaning the transducer by argon plasma etching after lapping but before depositing the first overcoat on the transducer.

24. The method of claim 15 wherein the writer includes an optical core comprising tantalum oxide embedded in a silicon dioxide encapsulate material, and the reader includes a ferromagnetic shield embedded in an alumina encapsulate material.

25. The method of claim 15 wherein the second overcoat comprises a material selected from the group consisting of Ti, Zr, Cr, titanium oxide, titanium nitride, zirconium oxide, zirconium nitride, an oxide of chromium, and a nitride of chromium.

26. The method of claim 15 wherein depositing the second overcoat on the transducer comprises radio frequency magnetron sputtering continued until the second overcoat has a thickness in the range of 2 to 5 nm.

* * * * *